United States Patent [19]
Williams et al.

[11] Patent Number: 5,877,681
[45] Date of Patent: Mar. 2, 1999

[54] SYSTEM AND METHOD FOR BROADCASTING COLORED LIGHT FOR EMERGENCY SIGNALLING

[75] Inventors: Jerry L. Williams, Tinley Park; Dennis J. Hilburger, Dolton; Jacek J. Jozwik, Richton Park, all of Ill.; Kent A. Kekeis, Hammond, Ind.; Timothy J. Mazies, Oak Forest; Gregory A. Sink, Lombard, both of Ill.; John M. Davenport, Lyndhurst, Ohio; Richard L. Hansler, Pepper Pike, Ohio; William J. Cassarly, Richmond Hts., Ohio

[73] Assignees: Federal Signal Corporation, Oak Brook, Ill.; General ELectric Company, Schenectady, N.Y.

[21] Appl. No.: 951,209

[22] Filed: Sep. 18, 1997

Related U.S. Application Data

[63] Continuation of Ser. No. 382,647, Feb. 2, 1995, abandoned.

[51] Int. Cl.⁶ ...................................................... B60Q 1/52
[52] U.S. Cl. ..................... 340/471; 340/472; 340/468; 340/478; 362/32; 362/80
[58] Field of Search .................................... 340/471, 478, 340/483

[56] References Cited

U.S. PATENT DOCUMENTS

| 2,858,478 | 10/1958 | Kershaw . | |
|---|---|---|---|
| 2,902,624 | 9/1959 | Wright . | |
| 3,536,908 | 10/1970 | Oster | 240/10.1 |

(List continued on next page.)

FOREIGN PATENT DOCUMENTS

| 559914 A1 | 9/1993 | European Pat. Off. . |
|---|---|---|
| 0 566 361 A2 | 10/1993 | European Pat. Off. . |
| 24 07 451 | 8/1975 | Germany . |
| 3434536 | 3/1986 | Germany . |
| 38798 | 10/1993 | Japan . |
| 700829 | 12/1953 | United Kingdom . |
| 1570684 | 7/1980 | United Kingdom . |
| 1584690 | 2/1981 | United Kingdom . |
| 2 238 109 | 5/1991 | United Kingdom . |
| WO 82/01942 | 6/1982 | WIPO . |

OTHER PUBLICATIONS

Ziaohui Ning, Roland Winston and Joseph O'Gallagher, "Dieletric totally internally reflecting concentrators," *Applied Optics*, vol. 26, No. 2, Jan. 15, 1987, pp. 300–305.

Robert P. Friedman and J.M. Gordon, "Optical designs for ultrahigh–flux infrared and solar energy collection: monolithic dieletric tailored edge–ray concentrators," *Applied Optics*, vol. 35, No. 34, Dec. 1, 1996, pp. 6684–6691.

Antonello Cutolo, Luigi Cartomusto, Francesco Reale and Ivo Rendina, "Tapered and inhomogeneous dielectric llight concentrators," *Applied Optics*, vol. 29, No. 9, Mar. 20, 1990, pp. 1353–1364.

Xiaohui Ning, Roland Winston and Joseph O'Gallagher, "Dielectric Totally Internally Reflecting Concentrators," *Applied Optics*, vol. 26, No. 2, Jan. 15, 1987.

Antonello Cutolo, Luigi Cartomusto, Francesco Reale and Ivo Rendina, "Tapered and Inhomogeneous Dielectric Light Concentrators," *Applied Optics*, vol. 29, No. 9, Mar. 20, 1990.

(List continued on next page.)

*Primary Examiner*—Brian Zimmerman
*Assistant Examiner*—Timothy Edwards, Jr.
*Attorney, Agent, or Firm*—Leydig, Voit & Mayer, Ltd.

[57] ABSTRACT

A lighting system and method for broadcasting colored lights as emergency warning signals from a light source. A centralized continuous light source is coupled via a fiber optic transmission medium to an external display location such as a lens or the like located on a vehicle. The color and the relative intensity of each color is periodically modulated to alternate between at least two states such that the contrast between these alternating states is perceived by observers to be a flashing source of light with no off-time. The frequency and the duty cycle of the repetition rate of alternating between the states may be further controlled to better draw attention to the light source.

44 Claims, 17 Drawing Sheets

U.S. PATENT DOCUMENTS

| | | |
|---|---|---|
| 3,764,799 | 10/1973 | Schulz ..................................... 240/24 |
| 4,023,887 | 5/1977 | Speers . |
| 4,104,615 | 8/1978 | Hunter ..................................... 340/84 |
| 4,236,191 | 11/1980 | Martinez ................................. 362/32 |
| 4,360,758 | 11/1982 | Thorton, Jr. et al. . |
| 4,471,385 | 9/1984 | Hyatt . |
| 4,473,866 | 9/1984 | Davis ...................................... 362/35 |
| 4,521,771 | 6/1985 | Alton . |
| 4,528,617 | 7/1985 | Blackington . |
| 4,626,966 | 12/1986 | Bleiwas et al. ......................... 362/35 |
| 4,704,660 | 11/1987 | Robbins .................................. 362/32 |
| 4,799,753 | 1/1989 | Breitbarth et al. . |
| 4,868,718 | 9/1989 | Davenport et al. ..................... 362/32 |
| 4,887,190 | 12/1989 | Sadamune et al. ..................... 362/32 |
| 4,894,591 | 1/1990 | Witting ................................... 315/248 |
| 4,930,049 | 5/1990 | Davenport et al. ..................... 362/32 |
| 4,949,227 | 8/1990 | Finch et al. ............................. 362/61 |
| 4,958,263 | 9/1990 | Davenport et al. ..................... 362/32 |
| 4,972,120 | 11/1990 | Witting ................................... 313/638 |
| 5,009,617 | 4/1991 | Thomas .................................. 439/679 |
| 5,010,319 | 4/1991 | Killinger . |
| 5,042,894 | 8/1991 | Swemer . |
| 5,047,695 | 9/1991 | Allen et al. ............................. 315/291 |
| 5,051,665 | 9/1991 | Garrison et al. ........................ 315/287 |
| 5,053,765 | 10/1991 | Sonehara et al. .................. 340/815.31 |
| 5,122,933 | 6/1992 | Johnson .................................. 362/32 |
| 5,184,883 | 2/1993 | Finch et al. ............................. 362/32 |
| 5,195,162 | 3/1993 | Sultan et al. . |
| 5,198,696 | 3/1993 | Dennis . |
| 5,239,230 | 8/1993 | Mathews et al. ....................... 313/571 |
| 5,247,280 | 9/1993 | Incorvaia et al. ....................... 340/471 |
| 5,257,168 | 10/1993 | Davenport et al. ..................... 362/32 |
| 5,260,686 | 11/1993 | Kuo ......................................... 340/479 |
| 5,268,977 | 12/1993 | Miller ...................................... 362/32 |
| 5,278,731 | 1/1994 | Davenport et al. ..................... 362/32 |
| 5,317,237 | 5/1994 | Allison et al. .......................... 315/307 |
| 5,341,445 | 8/1994 | Davenport et al. ..................... 385/39 |
| 5,343,367 | 8/1994 | Davenport et al. ..................... 362/32 |
| 5,365,413 | 11/1994 | Krammer ................................ 362/32 |
| 5,396,571 | 3/1995 | Saadatmanesh et al. . |
| 5,422,792 | 6/1995 | Neumann ................................ 362/32 |
| 5,434,756 | 7/1995 | Hus et al. ................................ 362/32 |
| 5,452,188 | 9/1995 | Green et al. ............................ 362/227 |
| 5,469,337 | 11/1995 | Cassarly et al. ........................ 362/32 |
| 5,475,285 | 12/1995 | Konopka . |
| 5,499,166 | 3/1996 | Kato et al. .............................. 362/32 |
| 5,528,714 | 6/1996 | Kingstone et al. ..................... 385/100 |
| 5,559,911 | 9/1996 | Forkner et al. ......................... 385/33 |
| 5,563,588 | 10/1996 | Belfer . |
| 5,585,782 | 12/1996 | Yosko . |
| 5,601,354 | 2/1997 | Horii et al. ............................. 362/32 |

OTHER PUBLICATIONS

Robert P. Friedman and J. M. Gordon, Optical Designs for Ultrahigh–flux Infrared and Solar Energy Collection: Monolithic Dielectric Tailored Edge–ray Connectors, *Applied Optics*, vol. 35, No. 34, Dec. 1, 1996.

Examiner's Search Report to the Comptroller under Section 17 on Application No. GB 9601359.4.

Yunfen Ji and Robert Wolsey, "Dimming Systems for High–Intensity Discharge Lamps," *Lighting Answers*, pp. 1–8, vol. 1, No. 4, Sep. 1994.

John F. Waymouth, "Electric Discharge Lamps," by M.I.T. Press, Cambridge, MA, Reprinted in *Monographs in Modern Electrical Technolgy*, Alexander Kusko, Series Editor, 6 pgs.

Dan McCosh, "Automotive Newsfront," *Popular Science*, 32–34 & 38–39 Jul. 1990.

"KKK–A–1822C Federal Specification For Ambulances," by General Services Administration, Federal Supply Service, Washington D.C. 20406, 17–20 (no date).

Brochure entitled "Micro Power–Light Das neue Mikro––Gasentladungslicht (D1)," by *Philips*, (no date).

Brochure entitled "The D1 gas discharge lamp for automobile headlights," (no date).

Brochure entitled "Hi•Lux™ Lamps," by Welch Allyn, Lighting Products Division, Skaneateles Falls, NY 13153–0187, 5 pgs. (no date).

"High Intensity Discharge Automotive Lighting," by Inland Fisher Guide Division, Warren, Michigan 48092–5905 and Hughes Power Products, Culver City, California 90230 (HPP Sep./1994).

"Price List for H.I.D. (High Intensity Discharge) Products," by Whelen Engineering Company, (effective date Jun./94).

Brochure entitled "H.I.D. High Intensity Discharge Solid State Light Source for Revolving Beasonc," by Whelen® Engineering Company, Chester, Connecticut 06412–0684, bearing a copyright notice of 1994.

Brochure entitled "Vari*Lite The Automated Lighting Company," bearing a copyright notice of 1994 Vari–Lite, Inc.

Advertisement by Lumenyte International Corp., Costa Mesa, California 92626, on "Lumenyte® Perimeter Lighting Systems," bearing a copyright notice of Mar. 4, 1993.

Advertisement by Lumenyte International Corp., Costa Mesa, California 92626, on "Pype Lite® Fiber Optic Unerwater Lighting," bearing a copyright notice of Oct. 19, 1992.

Brochure entitled "Fiber Optic Lighting At Its Best," by Lumenyte International Corp., Costa Mesa, California 92626, bearing a copyright notice of Mar. 2, 1993.

Product Brochure by Lumenyte International Corporation, Costa Mesa, California 92626 (Jul. 13, 1993).

Advertisment by Sharp Electronics Corporation, Simulated Screen Images, LCD Product Group (1994).

Projection Displays—1994 Tutorial, Presented by Fred Kahn, Kahn Int'l Consulting in Santa Clara Convention Center, Dec. 9, 1994.

"Lightpaint" list prices, Nov. 1994 by Lighting Technology.

Article on "RGB Unit" by Lighting Technology, London (no date).

Brochure on Product Specifications by Cable Lite™ Corporation, Dallas, Texas 75244 (no date).

LIGHT ENGINE $22_1$, MODE 1 →81

| TIME | 30% | 40% | 30% |
|---|---|---|---|
| LIGHT $19_1$ COLORS | WHITE | RED | RED |
| LIGHT $19_2$ COLORS | WHITE | RED | RED |
| LIGHT $19_3$ COLORS | WHITE | RED | RED |
| LIGHT $19_4$ COLORS | WHITE | RED | RED |
| INTENSITY | 35W | 60W | 84W |

LIGHT ENGINE $22_2$, MODE 1 →82

| TIME | 30% | 40% | 30% |
|---|---|---|---|
| LIGHT $19_5$ COLORS | WHITE | RED | RED |
| LIGHT $19_6$ COLORS | WHITE | RED | RED |
| LIGHT $19_7$ COLORS | AMBER | RED | RED |
| LIGHT $19_8$ COLORS | WHITE | RED | RED |
| INTENSITY | 35W | 60W | 84W |

LIGHT ENGINE $22_3$, MODE 1 →83

| TIME | 30% | 40% | 30% |
|---|---|---|---|
| LIGHT $19_9$ COLORS | WHITE | RED | RED |
| LIGHT $19_{10}$ COLORS | BLACK | AMBER | AMBER |
| LIGHT $19_{11}$ COLORS | WHITE | RED | RED |
| LIGHT $19_{12}$ COLORS | BLACK | WHITE | WHITE |
| INTENSITY | 35W | 60W | 84W |

FIG. 10A

LIGHT ENGINE $22_4$, MODE 1              ←—84

| TIME | 50% | 50% |
|---|---|---|
| LIGHT $19_{13}$ COLORS | RED | RED |
| LIGHT $19_{14}$ COLORS | RED | RED |
| LIGHT $19_{15}$ COLORS | RED | RED |
| LIGHT $19_{16}$ COLORS | RED | RED |
| INTENSITY | 35W | 84W |

LIGHT ENGINE $22_5$, MODE 1                    ←—85

| TIME | 30% | 40% | 30% |
|---|---|---|---|
| LIGHT $19_{17}$ COLORS | WHITE | RED | RED |
| LIGHT $19_{18}$ COLORS | WHITE | RED | RED |
| LIGHT $19_{19}$ COLORS | AMBER | RED | RED |
| LIGHT $19_{20}$ COLORS | WHITE | RED | RED |
| INTENSITY | 35W | 60W | 84W |

FIG. 10B

LIGHT ENGINE $22_1$, MODE 2  ← 91

| TIME | 30% | 40% | 30% |
|---|---|---|---|
| LIGHT $19_1$ COLORS | BLUE | RED | RED |
| LIGHT $19_2$ COLORS | BLUE | RED | RED |
| LIGHT $19_3$ COLORS | BLUE | RED | RED |
| LIGHT $19_4$ COLORS | BLUE | RED | RED |
| INTENSITY | 35W | 60W | 84W |

LIGHT ENGINE $22_2$, MODE 2  ← 92

| TIME | 30% | 40% | 30% |
|---|---|---|---|
| LIGHT $19_5$ COLORS | BLUE | RED | RED |
| LIGHT $19_6$ COLORS | BLUE | RED | RED |
| LIGHT $19_7$ COLORS | AMBER | RED | RED |
| LIGHT $19_8$ COLORS | BLUE | RED | RED |
| INTENSITY | 35W | 60W | 84W |

LIGHT ENGINE $22_3$, MODE 2  ← 93

| TIME | 30% | 40% | 30% |
|---|---|---|---|
| LIGHT $19_9$ COLORS | BLUE | RED | RED |
| LIGHT $19_{10}$ COLORS | BLACK | AMBER | AMBER |
| LIGHT $19_{11}$ COLORS | BLUE | RED | RED |
| LIGHT $19_{12}$ COLORS | BLUE | RED | RED |
| INTENSITY | 35W | 60W | 84W |

FIG. 10C

LIGHT ENGINE $22_4$, MODE 2   ↙94

| TIME | 50% | 50% |
|---|---|---|
| LIGHT $19_{13}$ COLORS | RED | RED |
| LIGHT $19_{14}$ COLORS | RED | RED |
| LIGHT $19_{15}$ COLORS | RED | RED |
| LIGHT $19_{16}$ COLORS | RED | RED |
| INTENSITY | 35W | 84W |

LIGHT ENGINE $22_5$, MODE 2   ↙95

| TIME | 30% | 40% | 30% |
|---|---|---|---|
| LIGHT $19_{17}$ COLORS | BLUE | RED | RED |
| LIGHT $19_{18}$ COLORS | BLUE | RED | RED |
| LIGHT $19_{19}$ COLORS | AMBER | RED | RED |
| LIGHT $19_{20}$ COLORS | BLUE | RED | RED |
| INTENSITY | 35W | 60W | 84W |

FIG. 10D

SYSTEM AND METHOD FOR BROADCASTING COLORED LIGHT FOR EMERGENCY SIGNALLING

This is a continuation application Ser. No. 08/382,647 filed on Feb. 2, 1995 now abandoned.

CROSS-REFERENCE TO RELATED APPLICATIONS

The present application is related to the following U.S. patent applications, which were filed concurrently with the present application: U.S. Ser. No. 08/382,717 to Cassarly et al., filed Feb. 2, 1995, and issued Sep. 9, 1997 as U.S. Pat. No. 5,664,863, entitled "Compact Uniform Beam Spreader For A High Brightness Centralized Lighting System"; and U.S. Ser. No. 08/382,713 to Allison et al., filed Feb. 2, 1995, entitled "Flashing Lighting System Using A Discharge Light Source," which has subsequently been abandoned in favor of U.S. Ser. No. 08/754,121, filed Nov. 18, 1996, which has also been abandoned.

FIELD OF THE INVENTION

The present invention relates generally to lighting systems, and more particularly to a centralized lighting system for emergency vehicle lights.

BACKGROUND OF THE INVENTION

Presently, emergency vehicles, including ambulances, police vehicles, and emergency fire apparatus vehicles, output visible warning signals through the use of a beacon or a light bar mounted thereon, or via flashing strobe lights built into the body of the vehicle. A beacon ordinarily houses a continuous light source radiated by a rotating reflector, while a light bar typically contains a number of flashing (strobing) light sources or light sources radiated by rotating mirrors. A flashing strobe light built into the body of the vehicle is typically covered by a plastic lens or the like to increase its visibility and to achieve a specific color.

To ensure effectiveness, these lighting systems are required to meet certain performance specifications, such as those proposed by the Ambulance Manufacturers Division of the National Truck Equipment Association, AMD Standard 016. Another ambulance specification, General Services Administration Specification KKK-A-1822C, requires a minimum number of lights disposed at specific display locations on the vehicle and arranged to radiate the light in a certain manner.

With a beacon, a motorized driving mechanism rotates a parabolic reflector in order to alternately block and focus the light radiated to a given location so that the light appears to observers to be intermittent rather than continuous. The driving mechanism includes a relatively large motor, making such beacon systems rather inefficient. Beacons are also limited to flashing one color based on the color of the transparent housing surrounding the bulb and reflector.

With strobing bulbs, the desired intermittent light patterns are accomplished by repeatedly flashing one or more of the bulbs on and off. For example, in a light bar some of the lights are color-filtered so that observers can better differentiate between these emergency lights and the white and red lights of ordinary vehicles, and so that observers can distinguish among the different types of emergency vehicles. However, in order to display a variety of colors, a number of bulbs must be provided at different display locations in the light bar, each bulb radiating through its own colored glass or the like. Moreover, in addition to emergency lights, other lights may be added to an emergency vehicle. For example, an ambulance is typically outfitted with scene lights, also known as load lights, to continuously illuminate the area around the vehicle when parked to facilitate the loading of a person.

Although functional, light bars, strobe lights and rotating beacons have a number of additional drawbacks associated therewith. One drawback common to all three types of lights is that the bulbs often fail as a result of road-induced failures of the filaments therein due to shock and vibration. The high failure rate necessitates the frequent performance of time-consuming testing and maintenance procedures. The operating life of these conventional filament-based bulbs is typically on the order of 300 hours.

Consideration must also be given to the design and adaptation of vehicles for the subsequent installation of emergency lights. Significant mounting hardware and wiring is required to add light bars or beacons to a vehicle, or to build strobe lights into a vehicle, particularly when converting an otherwise standard vehicle to an emergency vehicle. Moreover, the mounting of either a beacon or a light bar onto the vehicle can result in a reduction in the vehicle's aerodynamics.

Another drawback that results from the mounting of light bars or beacons onto emergency vehicles is that the vehicles necessarily become more conspicuous, even at times when no emergency is present and the lights are not activated. This is undesirable in certain situations. By way of example, police officers often desire to have their police cars remain inconspicuous, such as when situating themselves to observe potential traffic offenders.

Finally, ambulances need to have a very stable, high-capacity power source so that the sensitive medical equipment present therein operates properly. However, flashing intermittent lights produce large, uneven power demands and can generate unpredictable electronic noise. Accordingly, ambulances having conventional flashing lights must be provided with a well-regulated, uninterruptible power source and adequate shielding, such as by adding electronic filtering and/or a completely separate power system. This increases the complexity and cost of the vehicle.

OBJECTS AND SUMMARY OF THE INVENTION

Accordingly, it is an object of the present invention to provide an emergency vehicle lighting system that provides warning lights to meet emergency vehicle lighting specifications without employing filament-containing bulbs.

Another object is to provide a lighting system as characterized above that enables each display location on the vehicle to broadcast light in one or more distinct colors.

It is a related object to provide such a lighting system that utilizes a continuous light source to efficiently provide a contrasting light pattern without requiring rotating reflector.

It is another object to provide a lighting system as characterized above that may be incorporated into a vehicle without significantly altering the profile of the vehicle, thereby maintaining the vehicle's aerodynamics while allowing it to remain inconspicuous when necessary.

It is another object to simplify the installation and maintenance of an emergency lighting system in a vehicle.

It is also an object to provide a lighting system of the above kind that draws power in a substantially constant manner.

Briefly, the inventionnprovides a system and method for generating and broadcasting emergency lighting signals from a continuous light source disposed at an interior location of a vehicle. A modulator optically coupled to the continuous light source modifies the properties of the continuous light into modulated light varying between at least two output states. Means optically couple the modulator to an exterior of the vehicle for conveying the modulated light from the interior location to broadcast the modulated light from the vehicle.

In one embodiment, the system includes a fiber optic transmission medium for optically coupling the continuous light source to the modulator. A converter such as a lens may be employed as the means for conveying the modulated light from the interior to the exterior of the vehicle. Modulation of the light may include color filtering, intensity variation, or a combination of color filtering and intensity variation, and thus the modulator may comprise a filter. A controller may be provided to selectively control the filter setting and to further selectively modulate the intensity of the light. The controller may access a memory to periodically modulate the light in one or more operating patterns.

Other objects and advantages will become apparent from the following detailed description when taken in conjunction with the attached drawings, in which:

BRIEF DESCRIPTION OF THE DRAWINGS

FIGS. 10A–10D comprise a memory map for storing representative operating parameters for controlling a lighting system constructed in accordance with the invention;

Figure 1:
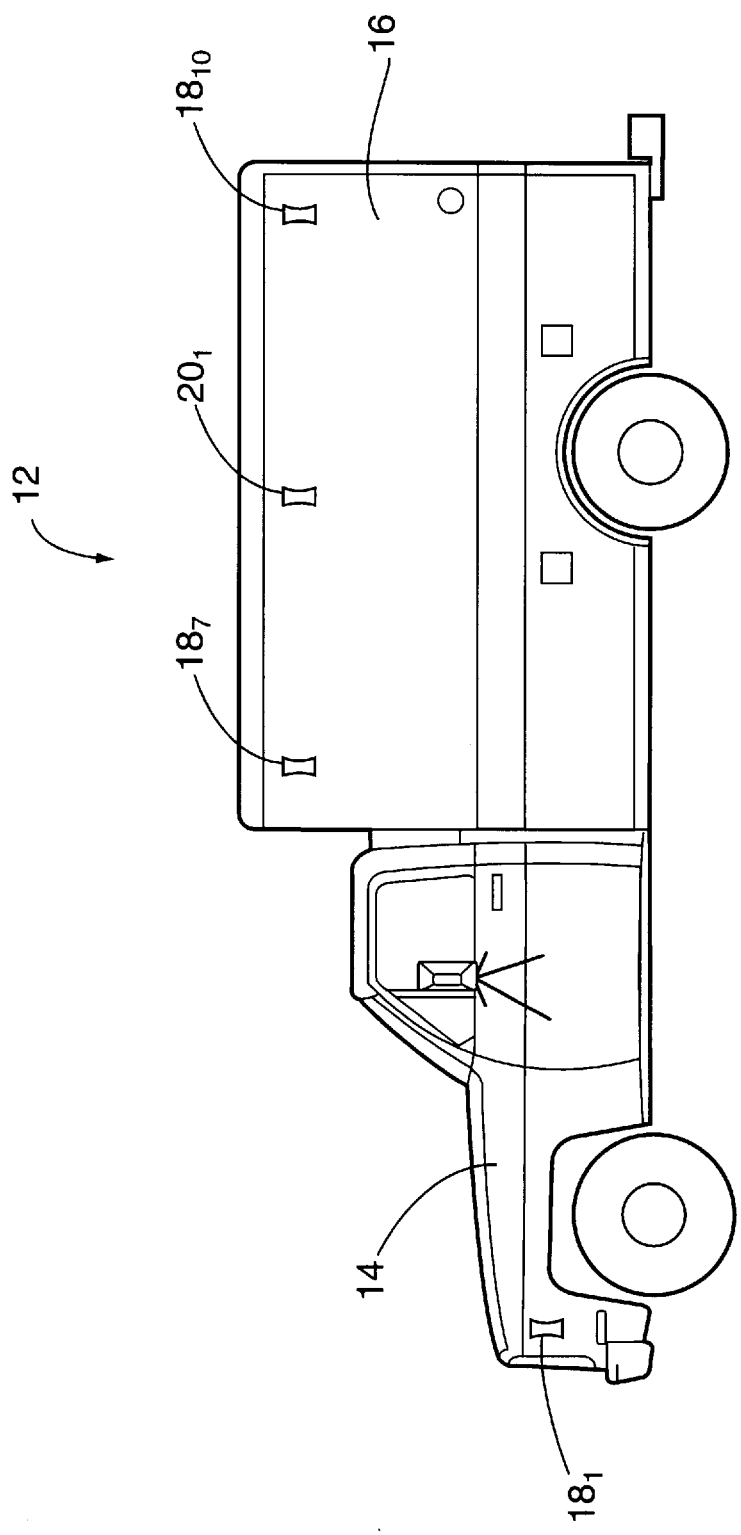
FIG. 1 is a side elevational view of an emergency vehicle such as an ambulance showing a number of general display locations for situating emergency lights.

While the invention is amenable to various modifications and alternative constructions, certain illustrated embodiments thereof have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention as expressed in the appended claims.

DETAILED DESCRIPTION OF THE PREFERRED EMBODIMENT

Figure 2:
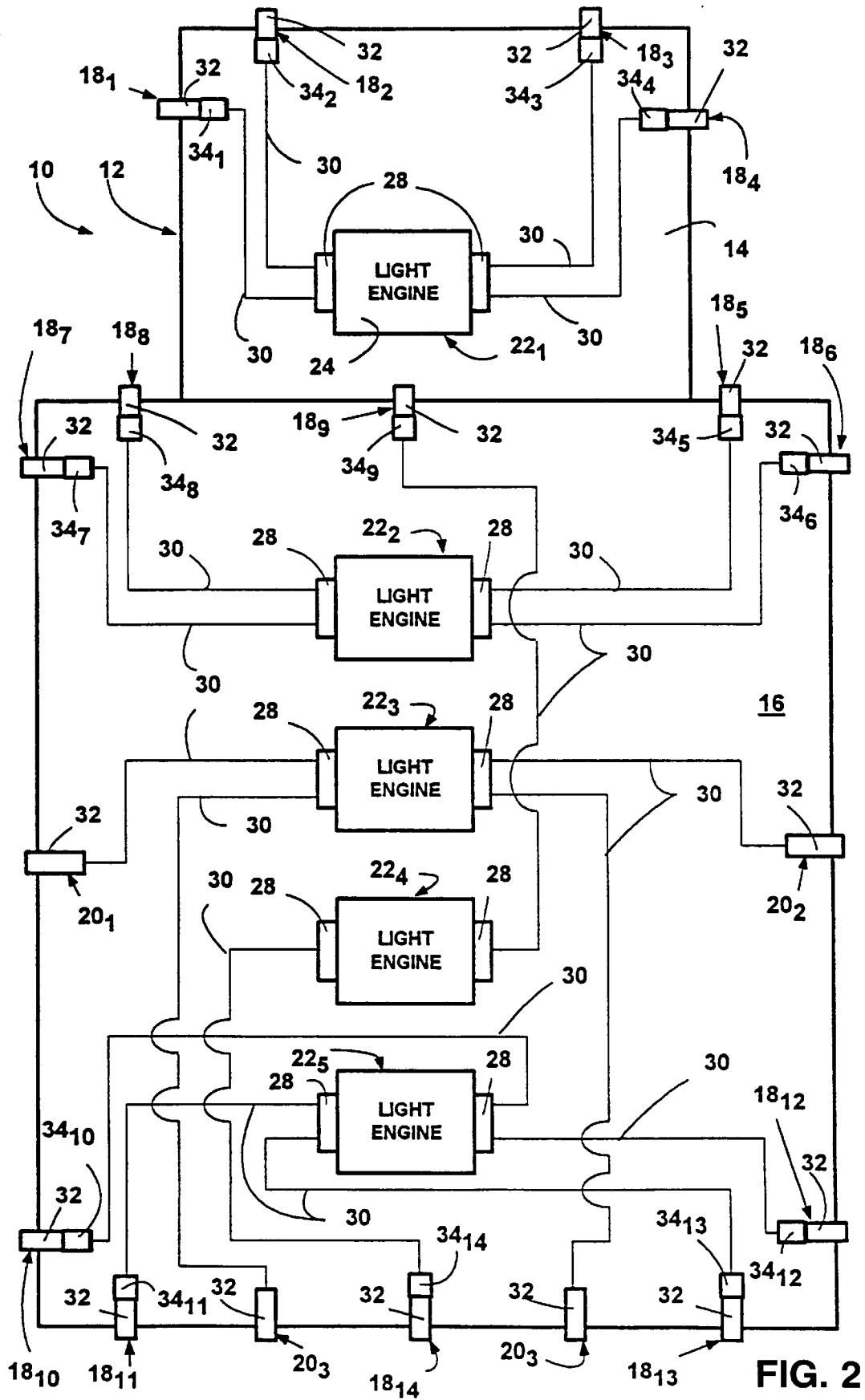
FIG. 2 is a plan view of an emergency vehicle such as the ambulance of FIG. 1 and constructed in accordance with the invention, illustrating a block diagram of high intensity discharge lamps and their optical transmission paths for connecting the lamps to a number of display locations.

Turning now to the drawings and referring first to FIGS. 1 and 2, there is shown a lighting system generally designated 10 incorporated into a vehicle 12 and constructed in accordance with the present invention. In one embodiment, the vehicle 12 is an ambulance including a forward portion 14 and a rear portion 16.

Figure 3B:
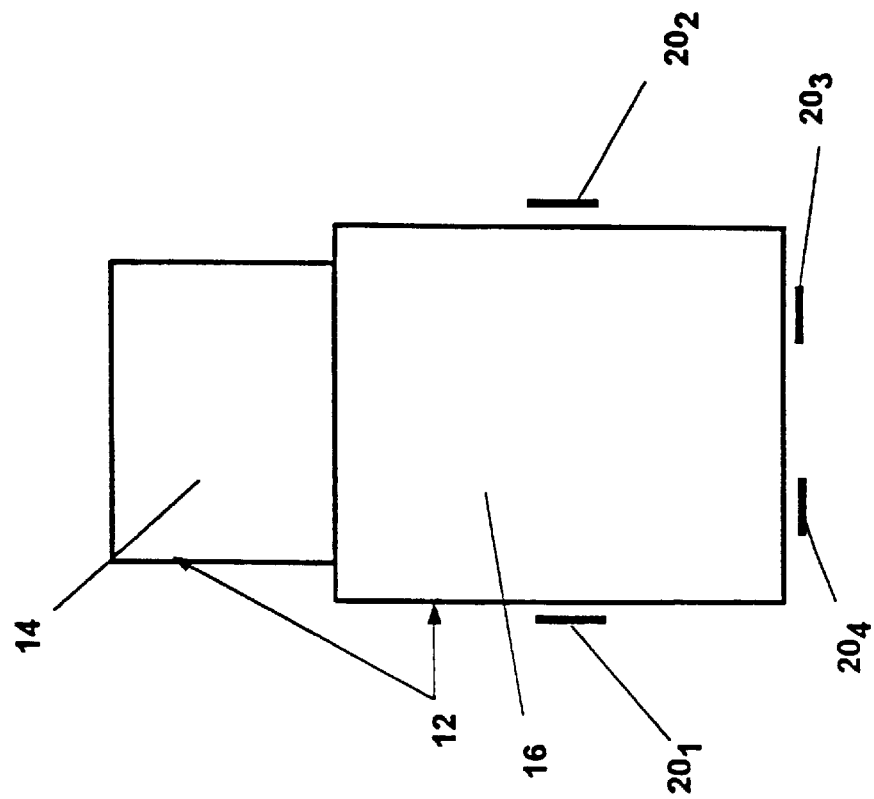
FIGS. 3A and 3B are top views representative of a particular manner of deploying a lighting system on an ambulance, showing the general location of emergency lights and scene lights, respectively.
Figure 3A:
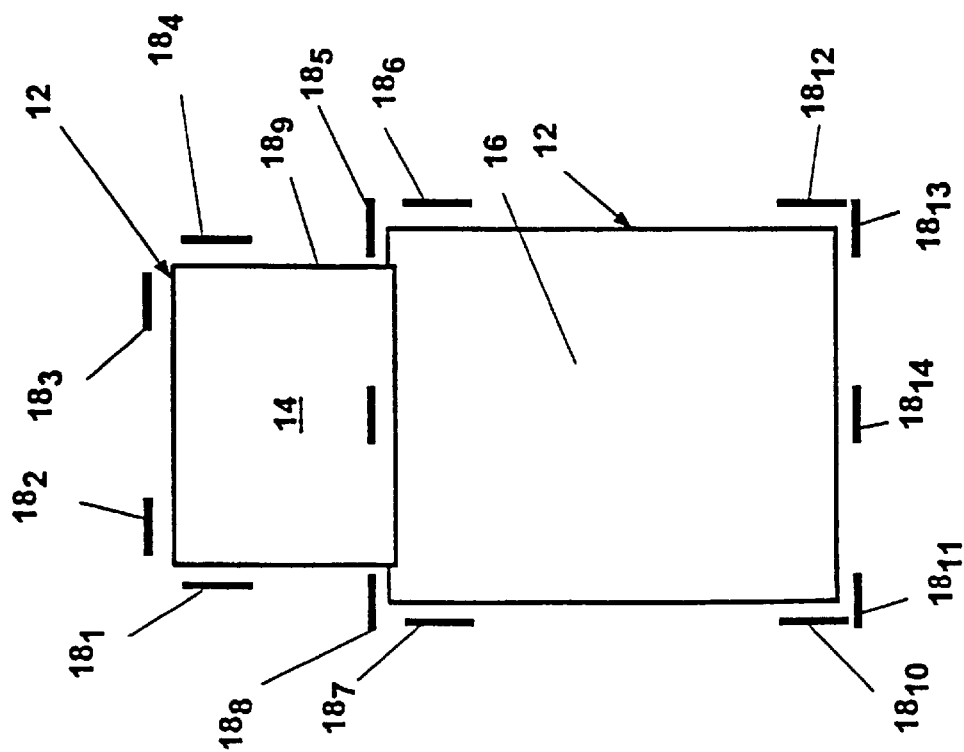

An ambulance lighting system may comprise a combination of two separate lighting systems as best shown in FIGS. 3A and 3B. In such a configuration, the first system (FIG. 3A) includes a plurality of emergency lights $18_1$–$18_{14}$ disposed around both the front portion 14 and the rear portion 16 of the vehicle 12. The emergency lights $18_1$–$18_{14}$ are activated to signal observers outside of the vehicle of an emergency situation. The second system (FIG. 3B) includes a plurality of auxiliary, or scene lights $20_1$–$20_4$ located on the rear portion 16 of the vehicle 12 at the rear, right and left sides thereof. The scene lights $20_1$–$20_4$ are ordinarily used to illuminate the side and rear areas around a parked ambulance to facilitate the loading of a person. The particular configuration illustrated in FIGS. 3A and 3B satisfies ambulance lighting design specifications such as General Services Administration Specification KKK-A-1822C, which sets forth the minimum number of light sources required on an ambulance and their locations.

In accordance with one aspect of the invention and as shown in FIG. 2, the light is piped from one or more light sources (e.g., $22_1$) centrally disposed in an interior location of the emergency vehicle 12 to the exterior thereof. Unlike conventional lighting systems, in the preferred embodiment the light sources are not ordinarily intended to be directly visible from a viewpoint external to the vehicle. Indeed, the light sources may be installed at any convenient location in the vehicle 12, such as mounted to the vehicle floor behind or underneath the front seats.

Figure 4:
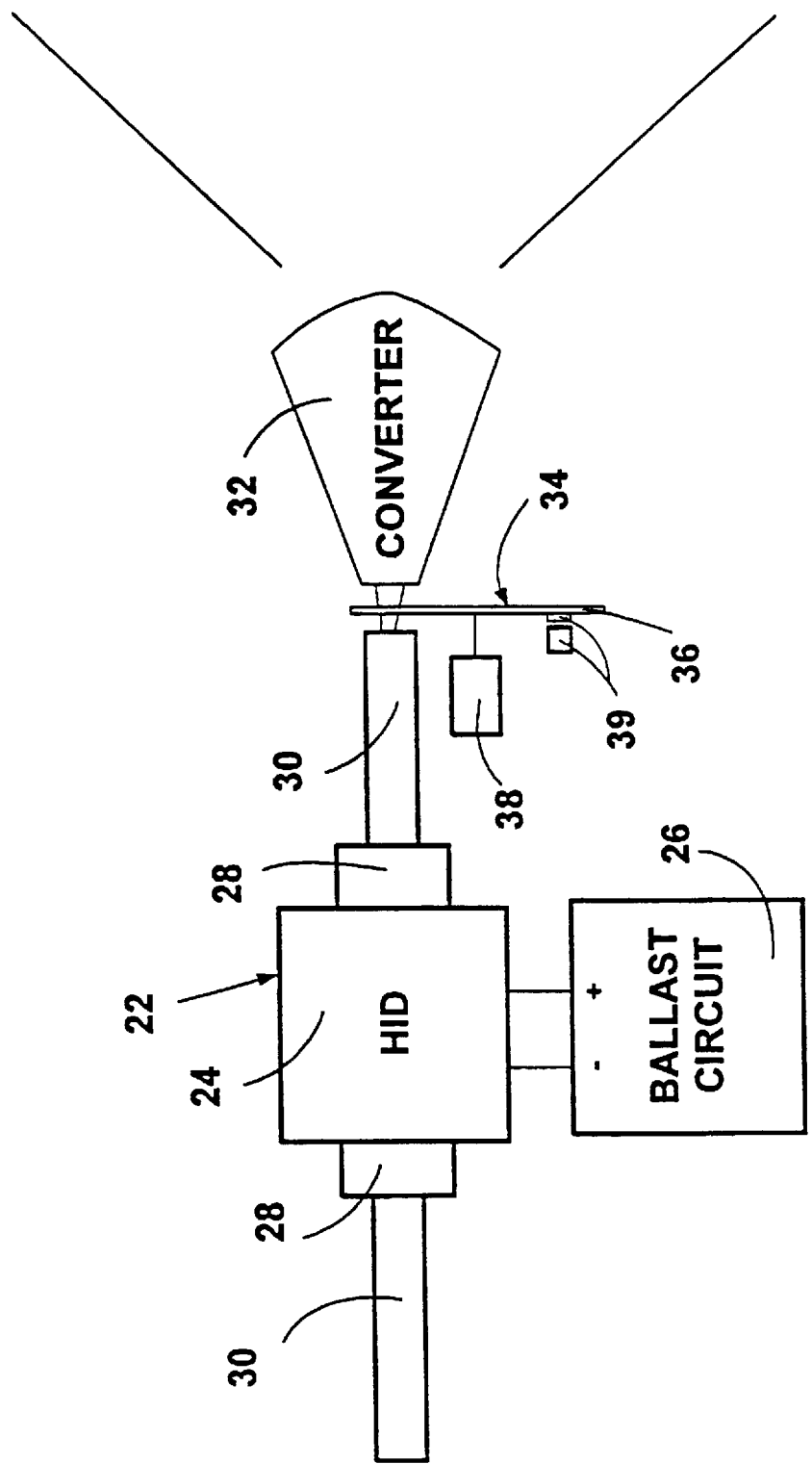
FIG. 4 is a block diagram illustrating one manner of connecting the lamps to the light distribution converters through a filter.

As shown in FIG. 4, each light source, alternatively referred to as a light engine 22, preferably comprises a high intensity discharge lamp (HID) 24, a ballast circuit 26 for supplying an appropriate amount of power to operate the HID 24, and one or more ports 28 for coupling fiber optic light pipes (or bundles) 30 thereto. Such light engines 22 may utilize a xenon-metal halide lamp operated by a low-voltage ballast circuit in order to continuously provide broadband light as described in U.S. Pat. Nos. 5,047,695 and 5,317,237. These light engines 22 provide light on the order of 2,000 to 15,000 lumens of light and have operating lives of approximately 3000 to 5000 hours. (A relatively low voltage signal provided to the ballast circuit modulates the output power level as described in more detail below.) One type of light engine particularly suitable for use in the present lighting system 10 is manufactured by General Electric Corporation. This type of light is capable of continuous operation at sixty watts, with a peak power level in excess of this average when combined with operating periods below this average power provided that an overall average power level of sixty watts is maintained.

Thus, as shown in FIG. 2, the emergency vehicle 12 described herein has a number of light engines $22_1$–$22_5$ disposed in the interior thereof coupled to the fiber optic light pipes 30. The light pipes 30 in turn act as a transmission medium to transmit the continuous broadband light from the light engines $22_1$–$22_5$ towards the exterior of the vehicle 12. Small openings are made in the vehicle body to allow the light to be broadcast therefrom. As utilized herein, the term "continuous" is intended to mean lights that, when activated, are not intermittently illuminated and extinguished, and may generally appear to be continuous to a human observer, as distinguished from strobing lights which are alternately illuminated and extinguished. Thus, continuous lights include lights that are constantly ignited, illuminated or arcing as well as those that are pulsed at a high enough frequency wherein the individual pulses are not individually distinguishable from one another. As used herein, continuous lights may also vary in intensity (such as described in the related copending U.S. Patent Application entitled "Flashing Lighting System Using a Discharge Light Source," by Joseph M. Allison et al., Attorney Docket No. LD 10796, filed Feb. 2, 1995) and still be considered continuous. In addition, the term "broadband" is intended to mean light comprising a mixture of visible frequencies of light, typically appearing in combination as various shades of white.

The light pipes 30 are preferably acrylic-based and have an elliptical cross-section. The elliptical shape provides desirable dispersion characteristics and further allows one such pipe to be conveniently extended lengthwise atop another. Light pipes of this type are commercially available from Lumenyte Corporation, Costa Mesa, Calif.

To prevent the heat of the light engines $22_1$–$22_n$ from damaging the light pipes 30, the light pipes 30 may be coupled to the light engines $22_1$–$22_n$ through a cylindrically-shaped piece of quartz or other such material. In addition, the quartz may be doped to dissipate ultraviolet light. For efficiency, the light engines $22_1$–$22_n$ contain ellipsoidal mirrors, the lamp at one focus of the ellipsoid and the receiving end of the light pipe 30 (or quartz coupling) positioned at the other focus. Once the light enters the light pipe 30, the transmission of light therethrough to the external display locations takes place in a well known manner.

At each display location, a light converter 32 is inserted through an opening in the vehicle 12, and functions as a lens to radiate the light exiting the light pipe 30 in a desirable manner, generally outwardly from the vehicle 12. For example, one such lens diffracts the light with minimal diffusion to increase the illumination angle from an approximately thirty degree cone of light to approximately ninety degrees in the horizontal plane. In the vertical plane, the converters 32 typically diffract the light between approximately twenty and thirty degrees, satisfying typical specifications which require minimum candela readings at ten degrees vertical. The converters 32 also serve to protect the interior of the vehicle 12 from the outside elements, and may be made of transparent plastic or glass. Alternatively, the converters 32 may be configured as light diffusers in order to scatter the light and increase the apparent area of the light source to an external observer.

As can be appreciated, the lighting system 10 is relatively easy to install in a vehicle, since only a small opening needs to be drilled or cut through the vehicle body to provide a passageway for one of the converters 32, or one of the light pipes 30 or light therefrom to pass through. Each converter 32 is inserted through its corresponding opening and preferably sealed around its periphery (such as with a rubber grommet) to function as both a lens and a protective barrier as previously described. Moreover, because the effective exposed area of the converters 32 is small in size with respect to conventional beacons or light bars, the profile of the vehicle 12 remains relatively unchanged. Thus, with the present invention the aerodynamic characteristics of a vehicle are substantially maintained, particularly when compared with police vehicles or the like having light bars or beacons thereon.

FIGS. 12A–12D illustrate optical converters 32 suitable for use with the present invention. Similar such converters are described in more detail in the related copending U.S. patent application "A compact Uniform Beam Spreader for a High Brightness Centralized Lighting System," by William J. Cassarly et al., Attorney Docket No. LD 10795, filed Feb. 2, 1995.

Figure 12A:
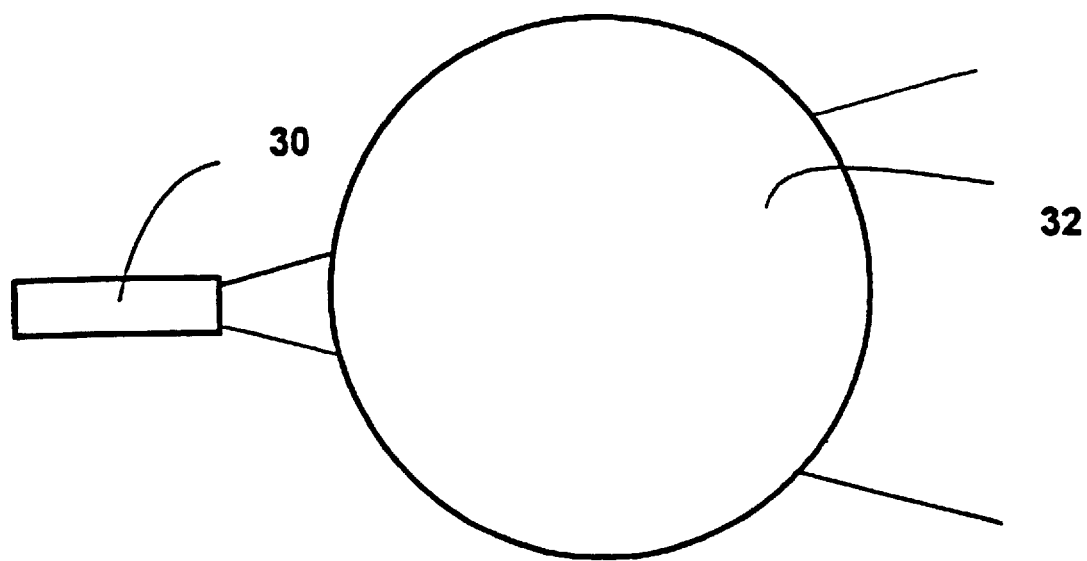
FIGS. 12A–12D are various views of optical converters suitable for use with a lighting system constructed in accordance with the invention.
Figure 12B:
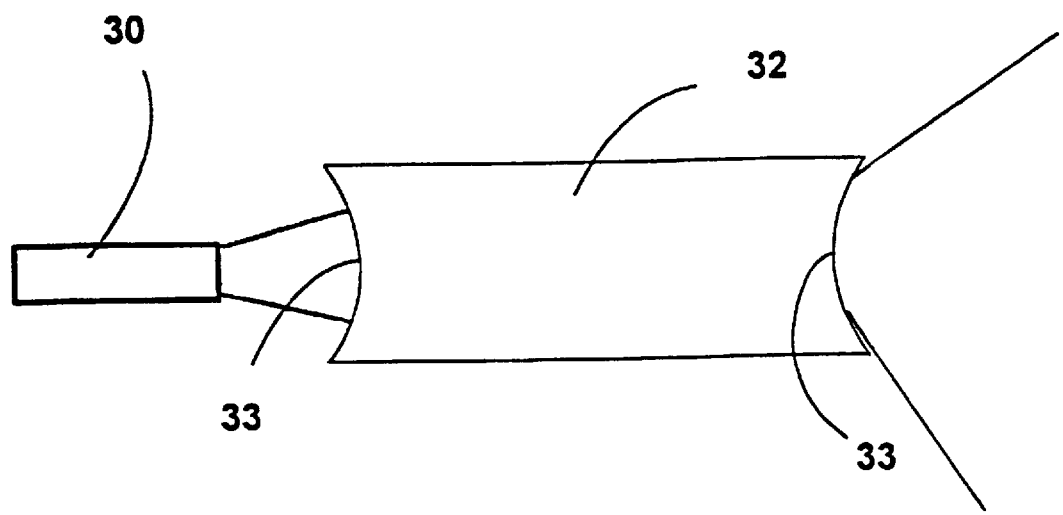

FIGS. 12A–12B are a side view and a top view, respectively, of a converter 32 optically coupled to an elliptical light pipe 30. The curved surfaces 33 minimize nulls in the output light distribution as described in the previously-identified Cassarly et al. application, Docket No. LD 10795. A converter 32 of this type has been utilized with the present invention in a prototype system configured in accordance with FIG. 9, and diffracts the light so as to meet ambulance lighting performance specifications, e.g., ninety degrees in the horizontal plane, thirty degrees in the vertical plane.

Figure 12C:
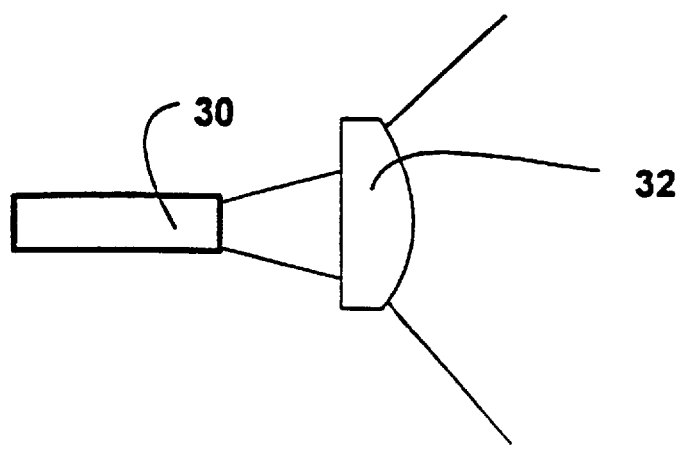

FIG. 12C is a top view of a converter 32 optically coupled to an elliptical light pipe 30, and configured as a planoconvex lens to refract and diffract the received light in a manner that is suitable for use with the present invention. A Fresnel lens having comparable optical refraction and/or diffraction characteristics may similarly be utilized as an optical converter 32.

Figure 12D:
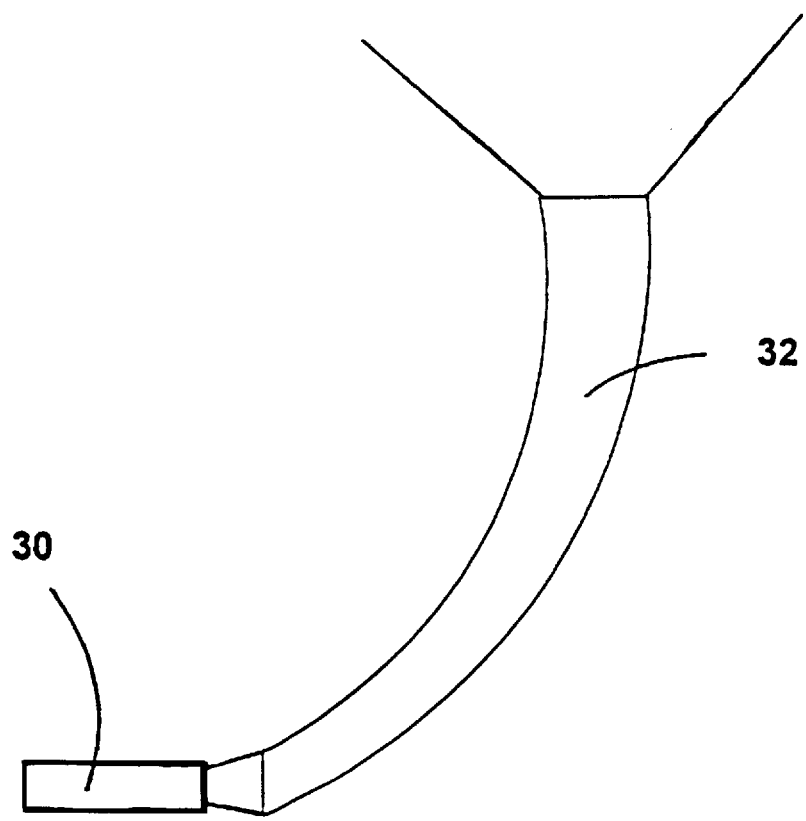

FIG. 12D is a top view of another type of converter 32 also suitable for use with the present invention. This converter 32 is configured for total internal reflection to bend the light received from the light pipe 30 approximately ninety degrees. The tapering of the converter 32 of FIG. 12D diverges the light in the desired manner for broadcasting from the vehicle 12.

In accordance with one aspect of the invention, at least some of the broadband light provided by the light engines $22_1$–$22_5$ is modulated in order to periodically change output states before being broadcast from the vehicle 12. Observers perceive the contrast between the different states as flashing. Moreover, in order to meet performance specifications for emergency vehicles, the light broadcast from the vehicle 12 must appear to observers to be flashing at rates characteristic of emergency vehicles, generally between 60 and 240 flashes per minute (one to four hertz) as standardized by the Society of Automotive Engineers (SAE J-845, SAE J-595, SAE J-1318) for emergency warning lights. Of course, these standard rates are not absolute, and thus the system 10 may be adapted for broadcasting light at other perceptible flash rates, for example rates ranging from 0.1 hertz to 10 hertz. The control circuitry for controlling the flash rate is described in more detail below.

Figure 7:
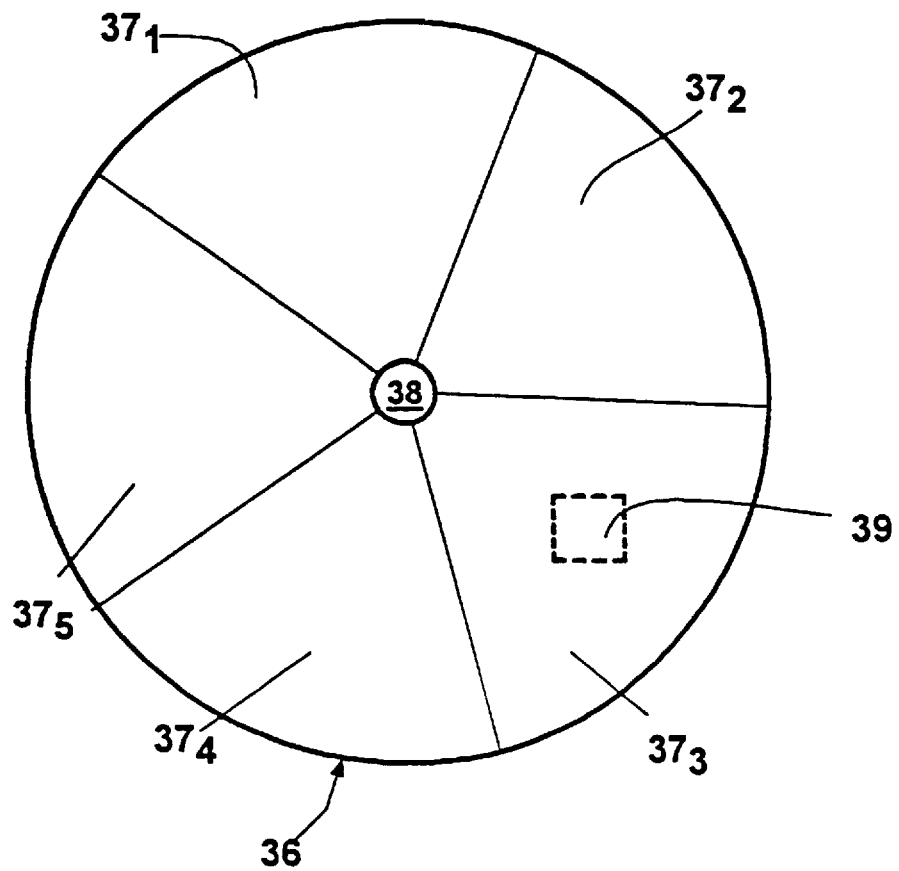
FIG. 7 is a front view illustrative of one type of filter suitable for use with the present invention.

One manner of modulating the light involves periodically modifying the spectral composition of the light broadcast from the vehicle 12 at selected converters 32 so as to provide lighting of the appropriate colors for that type of emergency vehicle, e.g., red, amber and white (unfiltered) for an ambulance. The color modulation is preferably performed by filtering the broadband light exiting selected light pipes 30 with a variable filter 34 before it reaches its corresponding optical converter 32. To this end, in one embodiment a color wheel 36 (FIG. 4, FIG. 7) having the desired color filters incorporated therein is disposed between the light pipes 30 and the optical converter 32 to serve as the variable filter 34. Alternatively it is feasible to immediately filter the light at the light engine 22, i.e., before it enters the fiber optic transmission path 30.

Regardless of the location that the filter 34 is inserted, by connecting the color wheel 36 to a motorized driving mechanism 38 (FIG. 4) for rotation, the light broadcast from the vehicle periodically changes its spectral composition at a rate dependent on the rotation of the color wheel 36. Of course, one of the sections (e.g., section $37_1$) in the color wheel 36 can be transparent to all wavelengths of visible light so that one of the broadcast states is white light. Alternatively, one of the sections (e.g., section $37_3$) of the color wheel 36 may be opaque to all frequencies of visible light, enabling the emulation of a conventional on-off flash pattern. Such an opaque section may also be used to block even low levels of light that may be present during a low-power standby mode, described in more detail below. Two or more selectively-oriented polarized filters may be arranged in series and coordinated to further increase the number of display patterns available.

In one embodiment of the invention, a plurality of color wheels 36 serve as the variable filters 34 and the motors 38 driving the color wheels 36 are stepper motors. This enables electrical output pulses to determine the direction and speed of rotation of each of the color wheels 36, thereby determining the settings of the variable filter 34 and consequently the colors of the light broadcasted from the vehicle 12, as well as the frequency and duty cycle of the flash rate. One suitable stepper motor is manufactured by Nippon Pulse Motor Co., Ltd., commercially available from Inland Stepper Motors, Sierra Vista, Ariz., Part No. PF42T-48.

Figure 5:
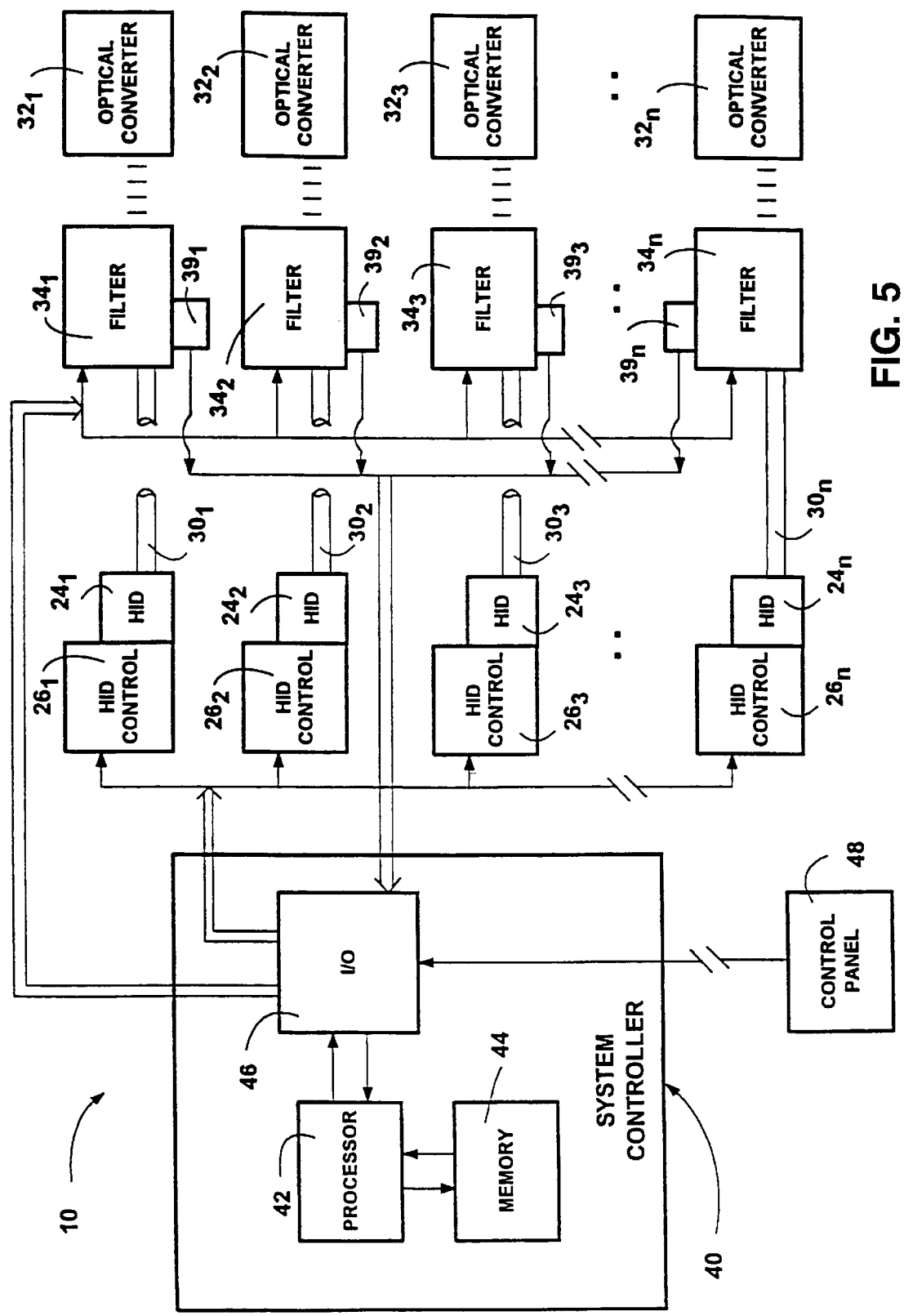
FIG. 5 is a block diagram of a circuit suitable for controlling a lighting system according to the present invention.

To modulate the spectral composition of the broadcasted light, a system controller 40 is provided as shown in FIG. 5. Preferably, the system controller 40 includes a processor 42 operatively connected to a memory 44, and interfaced to the filters $34_1$–$34_n$ through input/output (I/O) circuitry 46. A control panel 48 having at least one switch thereon is connected to the system controller 40 to allow the vehicle operator to select among preset flash patterns stored in the memory 44, depending on the type of emergency situation selected by the vehicle's operator. A similar system controller for controlling the flash patterns in an emergency vehicle is described in U.S. patent application Ser. No. 07/592,557, assigned to Federal Signal Corporation, University Park, Ill.

Figure 6:
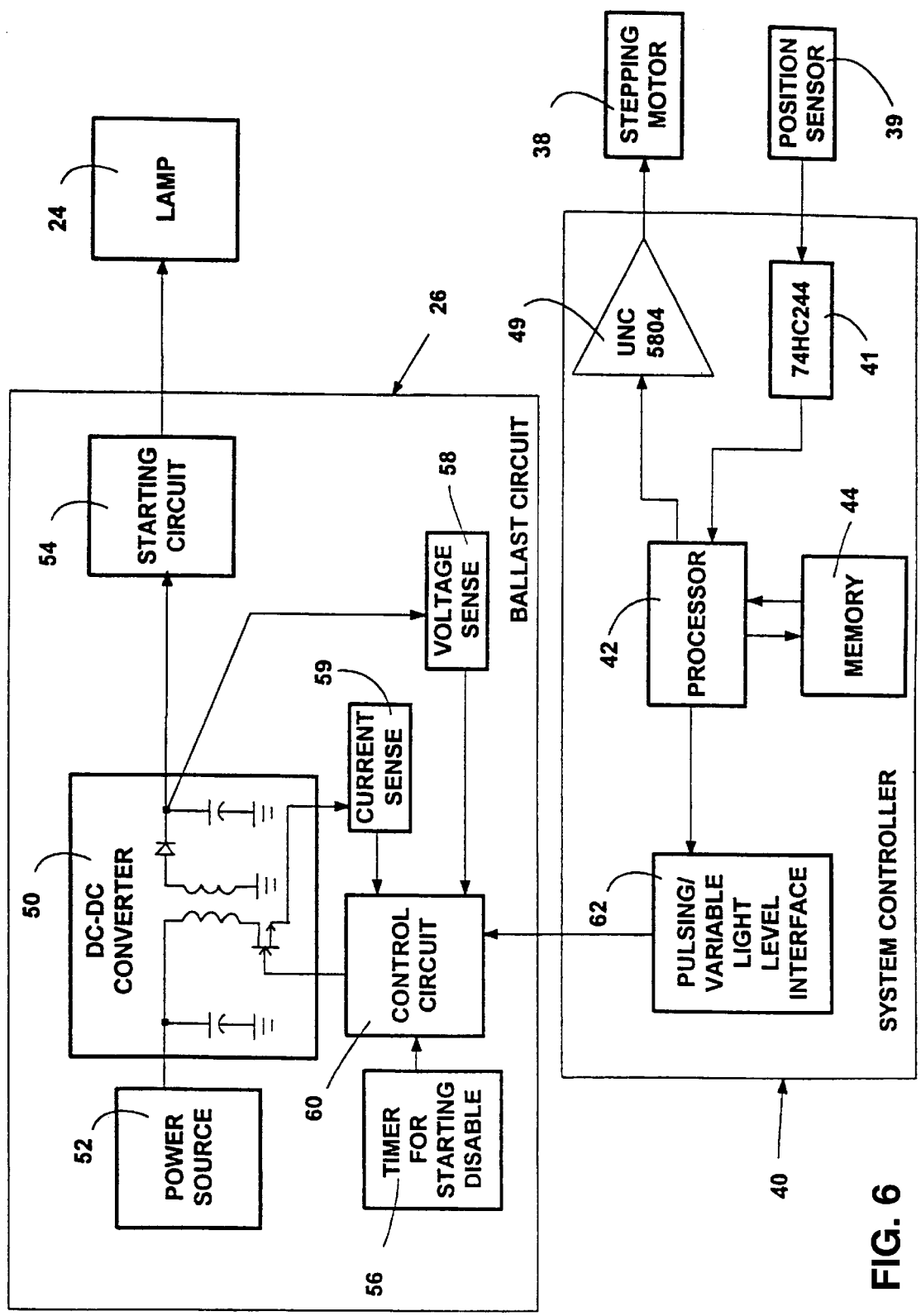
FIG. 6 is a block diagram of a circuit suitable for interfacing to the system controller of FIG. 5 to control the operation of the discharge lamps and filters.

To provide the current necessary for rotating the color wheels 36, the processor is connected to the stepper motor 38 through driver 49, which may be a UNC 5804 integrated circuit commercially available from Allegro Corporation. To position the color wheel, a position sensor 39 is mounted onto one of the sections of the color wheel, e.g., section $37_3$ (FIG. 7), to report the angular position to the processor 42. For example, the position sensor 39 may comprise a conductive strip or magnet in conjunction with a corresponding switch, such that the switch is closed at a certain angular position of the wheel. This provides the processor 42 with closed-loop control over the filter setting via control of the stepper motor 38. If an opaque section is present on the color wheel, the metal strip is affixed, e.g., glued, to that section since any blocking effect caused by the strip is irrelevant at that wheel position. As shown in FIG. 6, a buffer 41 such as a 74HC244 (TTL) integrated circuit may be used to connect the sensor 39 (and other such sensors) to the processor 42.

In one alternate embodiment, one or more of the filters 34 may include a dichroic mirror or the like that reflects only specified frequencies while passing the other spectral frequencies to modulate the light. In another alternate embodiment, the filters 34 may be electronic filters such as liquid crystal displays that enable voltage-controlled filtering of select wavelengths of light. In yet another embodiment, the filters 34 may comprise acousto-optic tunable filters which filter select wavelengths of light across the visible spectrum according to the frequency of an ultrasonic signal applied thereto. The use of electro-optic or acoustic optic filtering enables the system to function with no moving parts. When electro-optic filters are used to filter the light, the I/O circuitry 46 may include a D–A voltage converter to provide a variable voltage to the filter to determine the wavelengths filtered. Alternatively, a switching network may be included in the I/O circuitry 46 to enable controlled selection between two or more particular voltages. The switching network may similarly switch frequencies applied to an acousto-optic tunable filter thereby enabling selection of the wavelengths to filter.

Regardless of the filtering means 34 employed, since the available light is not strobed between a fully-on and fully-off state, all of the continuous light generated by the light engine 22 may be used. This may provide for improved recognition of the vehicle 12, while reducing the startling flashes that occur with conventional emergency lights.

Moreover, utilizing continuous light at varying states provides for significant flexibility in the lighting patterns broadcast to observers. For example, by controlling the amount of time that each color is broadcasted, such as by appropriately timing the positioning of the color wheel 36, the flashing colors may be utilized to convey additional information from the vehicle 12. By way of example, short red, long amber flashes may be used to indicate a vehicle moving at a high rate of speed, while long red, short amber may be used to indicate a slowed or stopped vehicle.

In addition to varying the spectral composition of the light, other characteristics of the broadcasted light may be modulated. In particular, the intensity of the light may be periodically varied such as to enhance the contrast between the colors. To this end, the intensity of the light engine 22 is controlled by an appropriate control circuit as described below.

It can readily be appreciated that, to a certain extent, the operation of filtering itself reduces the luminous intensity broadcasted as a function of the wavelength being passed. For example, a red filter reduces the intensity more than an amber filter, while the unfiltered state does not reduce the intensity at all. Thus, when alternating between red and white (unfiltered), the contrast may be enhanced by increasing the power driving the light engine 22 to increase the intensity of the lamp 24 during the white (unfiltered) state, while reducing the power (and intensity) during the red (filtered) state. So that the more intense white light does not overwhelm the less-intense red light from the perspective of a viewer, the "on" time of the red flash may be a longer duration with respect to the "on" time of the white flash. In other words, the duty cycle of the red may be greater than fifty percent, the white less than fifty percent. However, it can be appreciated that this is only one manner of coordinating the spectral composition and intensity.

Indeed, the intensity settings need not be varied in synchronization with the filter settings. For example, the intensity may be varied sinusoidally at three hertz while the colors are changed in discrete steps at two hertz. The lighting system 10 may be arranged such that the color changes may lag or lead the intensity change, be in or out of phase, or such that one or both of the modulations may vary randomly. Moreover, the colors need not change in discrete steps, particularly if electronic filters are used. However, as described herein, for simplicity the colors and intensities will be modulated, if at all, in synchronization.

To modulate the intensities, the system controller 40 is interfaced to the ballast circuits $26_1$–$26_n$ of the light engines $22_1$–$22_n$ through I/O circuitry 46. As can be appreciated, the I/O circuitry 46 may include commercially available components such as one or more digital-to-analog (D–A) voltage converters or switches connected to appropriate amplifiers or attenuators as needed for selectively providing control signals to the ballast circuits $26_1$–$26_n$ of the light engines $22_1$–$22_n$ to control the desired intensity. The I/O circuitry 46 may include electronic shielding, filters and/or opto-electronic isolators in order to eliminate ground loops, noise, crosstalk and the like.

As shown in FIG. 6, one such ballast circuit 26 includes a DC-to- DC converter 50, e.g., a flyback converter, for converting the voltage of a power source 52 such as a car battery to the level necessary for operating the high intensity discharge lamp 24. The ballast circuit 26 further includes a starting circuit 54 to generate high voltage pulses needed for igniting the lamp 24. These high-voltage pulses are generated until the lamp 24 is ignited, or until they are disabled by a timer circuit 56 should the lamp fail to ignite after a predetermined period of time.

Shortly after ignition, the lamp 24 is at a temperature below its regular operating temperature, resulting in poor light output efficiency and a low operating voltage. A voltage sensor circuit 58 detects this condition, and reports it to a control circuit 60, which is further connected to a current sensor circuit 59. The control circuit 60, which comprises a differential amplifier connected to adjust for the sensed current and voltage levels of the lamp 24, boosts the power to the lamp, e.g., by a factor of two, at the low voltage condition. As is well known in these types of DC-to-DC converters, the power supplied to the lamp 24 is controlled by the frequency of a switching pulse that discharges the primary transformer in the DC-to-DC converter 50. The control circuit 60 is preferably arranged such that the switching frequency is nominally centered around thirty kilohertz so as to be above audible frequencies.

The increase in power generated by the control circuit 60 at the sensed low voltage condition increases the light output, and as a further benefit reduces the amount of time that it takes for the lamp 24 to reach its regular operating temperature. As the lamp temperature increases, the voltage across the lamp 24 gradually increases. As the voltage sensor circuit 58 detects this, control circuit 60 appropriately decreases the power delivered to the lamp 24 until it reaches its nominal operating power, for example sixty watts.

To controllably vary the light intensity, a small voltage is added or subtracted to the sensed voltage input to the control circuit 60, causing the control circuit 60 to vary the switching frequency and thus the power level applied to the lamp 24. To this end, the processor 42 provides one or more output signals to an interface circuit 62 that switches an amount of voltage to be added to or subtracted from the sensed voltage. For example, a first output signal at a high level may close a solid state switch or the like in interface circuit 62 to add an appropriate amount of voltage, thereby resulting in a decrease in the power level, while a second output signal at a high level may be similarly employed to subtract an appropriate amount to increase the power. Alternatively, a digital-to-analog voltage converter may be incorporated into the interface circuit 62 to enable the processor 42 to offset the sensed voltage level, and consequently the power level, over a substantial number of values. In any event, the control circuit 60 adjusts the switching frequency and therefore the power level according to the sensed voltage as offset by voltages controlled by the processor 42. Similar ballast circuitry for controlling lamp intensity is described in the related copending U.S. patent application entitled "Flashing Lighting System Using a Discharge Light Source," by Joseph M. Allison et al., Attorney Docket No. LD 10796, filed Feb. 2, 1995.

Another benefit arising from the ability to control the power to lamp 24 is that the lamp 24 may be operated in a low power, standby mode. In the standby mode, the lamp 24 remains ignited at a low power level, ready for near-instantaneous activation to its full power. This is a significant advantage in emergency situations where a warm-up time may be dangerous. In addition, such "warm" start-ups obviate the drawing of extra power that occurs during a cold start-up, a condition which is stressful to the ballast circuit 26, the lamp 24, and the power system.

It can be readily appreciated that the power settings may be varied in either discrete steps or in gradual increments. For example, the intensity may vary in a manner corresponding to a ramped function, a sinusoidal function, or virtually any function.

Turning to an explanation of an operation of the invention with particular reference to FIGS. 8–11, at step 100 (FIG. 11), the system controller 40 polls the control panel 48 in order to determine when to activate the emergency lighting system 10. As previously described, the switch typically resides on a control panel 48 or the like accessible to an operator of the vehicle 12. When the control panel 48 indicates that no emergency is present, the light engines $22_1$–$22_5$ are ordinarily in the standby mode, effectively off, although not actually extinguished so as to be able to fully operate without requiring a significant warm-up time.

Figure 9:
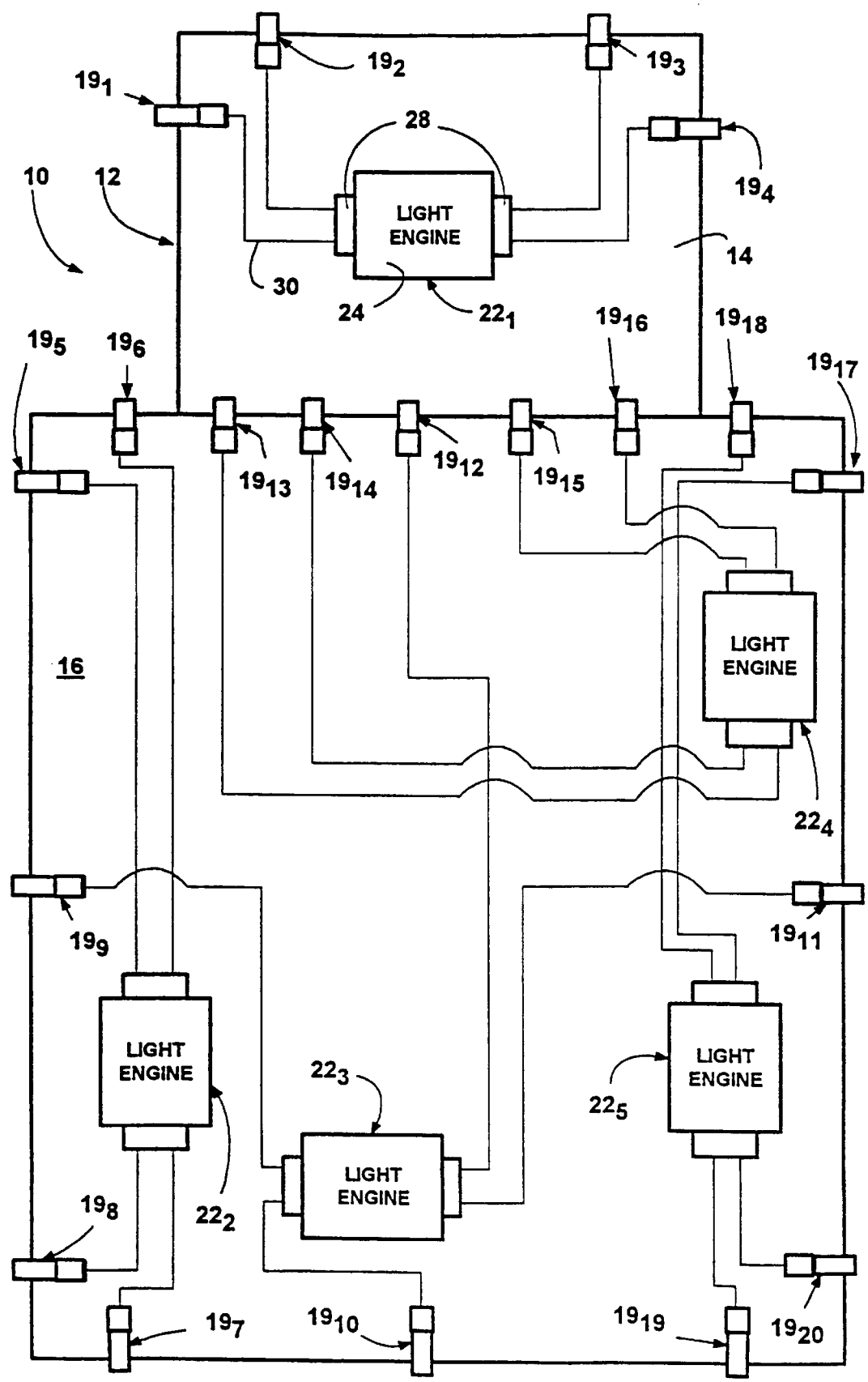
FIG. 9 is a plan view of a block diagram illustrating an alternate configuration of high intensity discharge lamps and their optical transmission paths to various display locations on an emergency vehicle.
Figure 11A:
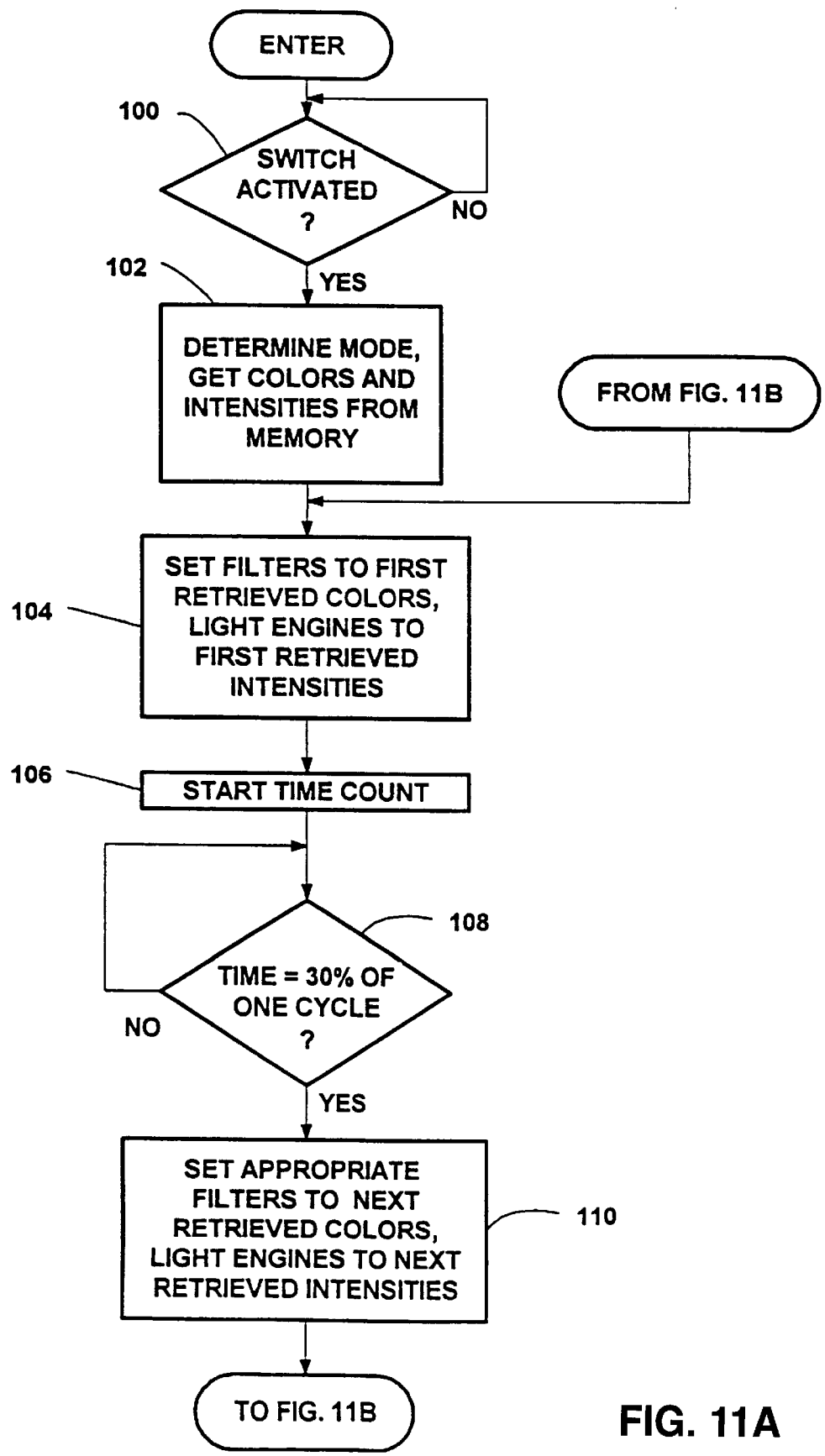
FIG. 11 is a flow diagram representing general steps for operating an emergency lighting system.
Figure 11B:
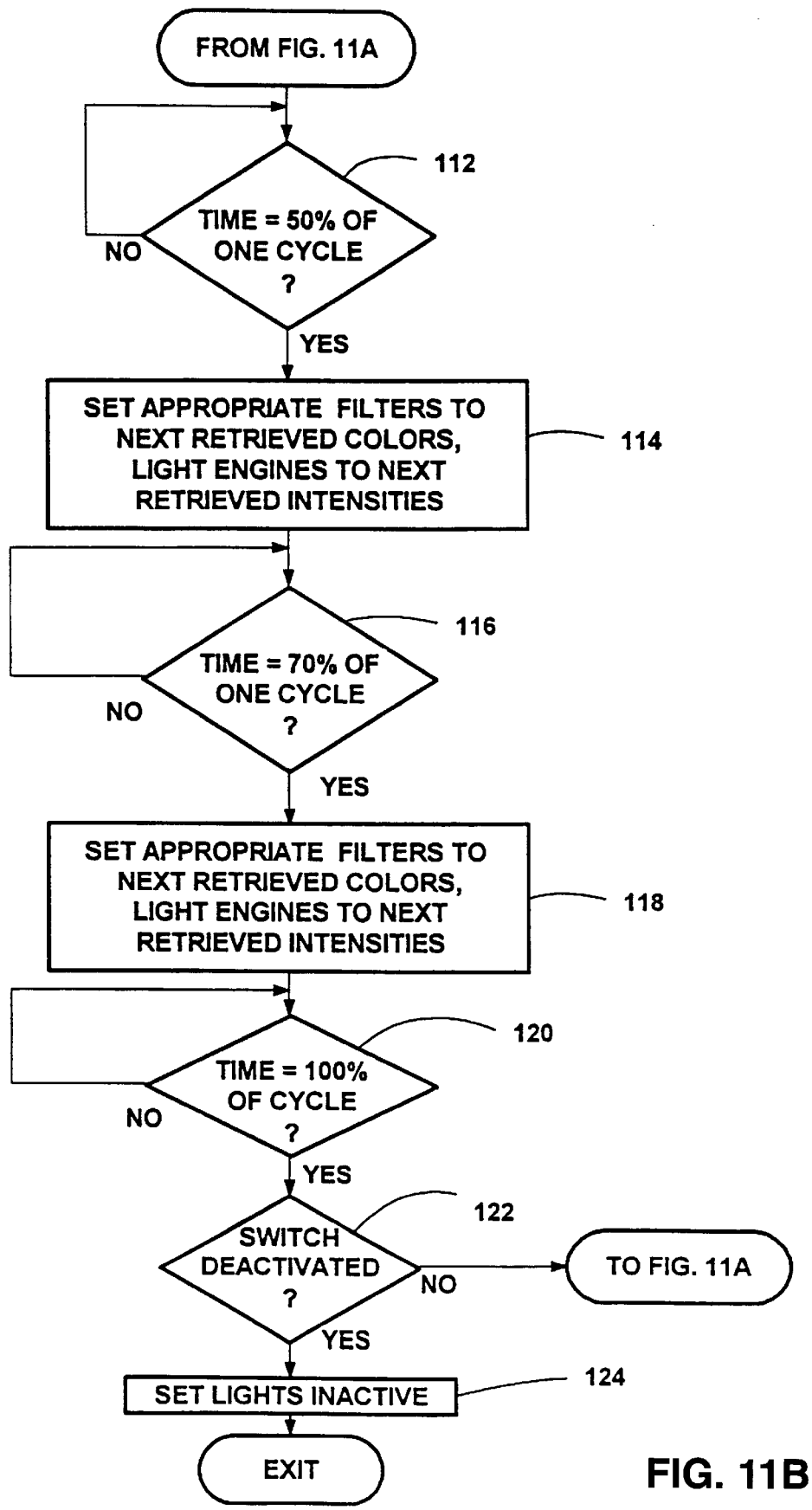

Once the actuation of a switch indicative of an emergency mode is detected, the processor 42 accesses its memory 44 at step 102 to obtain the parameters for operating the emergency lights, for example the several optical converters 32 which effectively appear to observers to be the "lights" $19_1$–$19_{20}$ of FIG. 9. It can be readily appreciated that the memory 44 is preferably non-volatile so that such settings are not lost upon an interruption of power. The switch or switches on the control panel 48 may also be used to indicate a particular mode for operating the lights $19_1$–$19_{20}$. For example, in the present invention the lights $19_9$–$19_{11}$ may either be operated as flashing lights or continuous scene lights depending on whether the vehicle is moving or parked.

FIGS. 10A and 10B represent look-up tables 81–85 in the memory 44 for a first operating mode, while FIGS. 10C and 10D represent look-up tables 91–95 for a second operating mode. For purposes of simplicity, only the first operating mode will be described herein, however it can be readily appreciated that the second operating mode functions in a similar manner. Moreover, the several display locations around the vehicle 12 will be referred to herein as lights $19_1$–$19_{20}$, although in keeping with the invention they are not the sources that originally generate the light.

When mode one is selected, the processor 42 reads the look-up table 81 for light engine $22_1$ (FIG. 9) in the memory 44 and obtains a first power setting of thirty-five Watts for a first thirty percent of the cycle, a second power setting of sixty Watts for the next forty percent of the cycle, and a third power setting of eighty-four Watts for the remaining thirty percent of the cycle. The wattage values may be reduced at night wherein a lesser intensity may be desirable, again by adjusting (increasing) the sensed voltage level.

The colors for the lights $19_1$–$19_4$ coupled to light engine $22_1$ are similarly obtained via table 81, i.e., red and white for mode one. The length of time of the cycle, for example one-half second, may be fixed, or alternatively obtained from the memory 44 or by any other suitable means.

Once the intensities, colors and times are obtained, the processor 44 sets the filters and lamps to their initial settings at step 104 and starts a timer at step 106. These settings are applied to the lights $19_1$–$19_{20}$ until the first time change, in this example thirty percent of the cycle, is detected at step 108.

At this thirty-percent time, the intensity settings and colors are changed at step 110 for certain of the lights as specified by the look-up tables. Similar color and/or intensity changes are made to the lights $19_1$–$19_{20}$ during steps 112–120. These steps will not be described in detail herein, however, the various settings may be determined by following the flow chart of FIG. 11 in conjunction with the look-up tables in FIGS. 10A–10D.

Thus, until deactivated, the process loops between steps 104–122. Accordingly, in mode one lights $19_1$–$19_6$, $19_8$–$19_9$, $19_{11}$, $19_{17}$–$19_{18}$ and $19_{20}$ will flash from white to red at thirty percent of the cycle, and back from red to white at one-hundred percent of the cycle. Lights $19_7$ and $19_{19}$ will change from amber to red and back to amber at the same times. Light $19_{10}$ will change between black and amber while light $19_{12}$ will change from black to white, again at the same percentages of the cycle. The corresponding power levels will also be modulated at thirty, seventy and one-hundred percent of the cycle as previously described.

However, unlike these particular lights, in the selected mode (mode one) lights $19_{13}$–$19_{16}$ will not change in color, remaining red, but will change in intensity, from thirty-five Watts to eighty-four Watts. As specified in look-up table 84 of FIG. 10B, these changes will occur at fifty percent and one-hundred percent of the one-half second cycle.

The lights are cycled in this manner until at step 122 the control panel 48 switch is determined to be deactivated, at which time the lights $19_1$–$19_{20}$ are ordinarily returned to their stand-by mode. Of course, the detection of the deactivation may occur at any time in the process, for example by way of a hardware interrupt. Moreover, the control panel 48 may alternatively indicate a change in operating mode instead of indicating complete deactivation of the lights.

Figure 8:
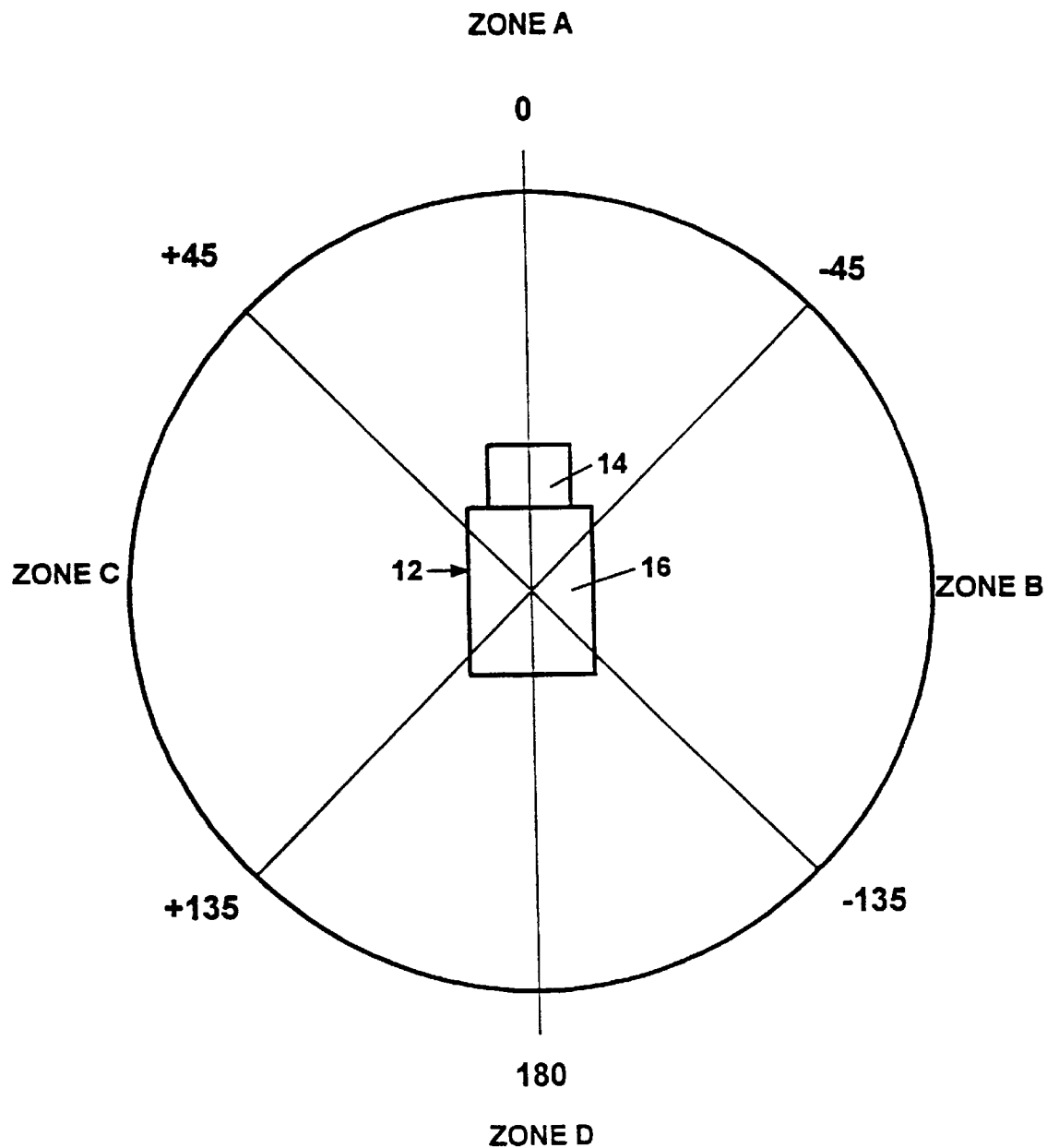
FIG. 8 is plan view illustrating four distinct illumination zones around an emergency vehicle as designated by a representative specification.

Although no particular settings or patterns are necessary to the invention, the settings described above have been selected to comply with at least one standard specification. For example, as shown in FIG. 8, in the AMD specification no white lights may appear in ZONE D, between +135 and −135 degrees, and similarly, no amber lights may appear in ZONE A, between +45 and −45 degrees. To ensure that the standards are met, the optical converters 32 are selected and arranged on the vehicle body so as to not broadcast the light outside of these limits, and the look-up tables have been appropriately recorded in memory 44 to properly modulate the output colors.

In alternative arrangements, it may be desirable to have the light pipes 30 arranged so that all of the light on any one side of the vehicle 12 does not originate from a common light engine. With such a configuration, at least some light will be visible from all directions in the event that one of the light engines $22_1$–$22_n$ fails.

Finally, the present invention allows lights $19_9$–$19_{11}$ to serve as both flashing lights and scene lights. For emergency lighting, the processor 42 modulates the corresponding filters 34 between two or more color settings, ordinarily in conjunction with the intensity as previously described. For scene lighting, the processor 42 adjusts the filters 34 to an unfiltered setting and sets the intensity as desired, generally to the normal operating intensity of the lamp $22_3$.

As can be seen from the foregoing detailed description, there is provided an emergency vehicle lighting system and method that provides warning lights to meet emergency vehicle lighting specifications without employing filament-containing bulbs. Each display location on the vehicle may be arranged to broadcast light in one or more distinct colors. The lighting system utilizes a continuous light source to efficiently provide a contrasting light pattern, and draws power in a substantially constant manner.

Moreover, the lighting system may be incorporated into a vehicle without significantly altering the profile of the vehicle. In addition, the installation and maintenance of an emergency lighting system in a vehicle is simplified.

All of the references cited herein are hereby incorporated in their entireties by reference.

What is claimed is:

1. A system for generating and broadcasting lighting signals from a vehicle, comprising: a source of continuous light having a substantially static spectral composition; a modulator optically coupled to the source for varying in time one or both of the spectral composition and intensity of the continuous light so as to modulate the continuous light between at least two output states; a converter optically coupled to the modulator for dispersing and refracting the modulated light and conveying it to an exterior of the vehicle, wherein the index of refraction of the converter is such that the modulated light is totally internally reflected while conveyed there through; a light pipe for communicating light from the continuous light source to the converter; and, the converter having optical properties that shape the dispersing light, into a desired shape for broadcasting from the vehicle.

2. The system of claim 1 wherein the source of continuous light is disposed in the vehicle at an interior location not directly visible from a viewpoint external to the vehicle.

3. The system of claim 1 further comprising a fiber optic transmission medium for optically coupling the continuous light source to the modulator.

4. The system of claim 1 wherein the converter includes a lens.

5. The system of claim 1 wherein the means for conveying the modulated light from the interior to the exterior of the vehicle includes a converter for refracting the modulated light.

6. The system of claim 1 further comprising a controller, wherein the controller controls the modulator to vary the modulated light in a pattern intended to communicate an emergency situation.

7. The system of claim 6 wherein the controller includes a memory that stores pattern information for controlling the modulator.

8. The system of claim 6 wherein the means for conveying the light from the interior to the exterior of the vehicle further includes a fiber optic transmission path optically coupled between the modulator and the converter.

9. The system of claim 1 wherein the modulator includes a filter having at least two selectable settings for modulating the spectral composition of the light, and a controller connected to the filter for selecting the setting thereof.

10. The system of claim 9 wherein the controller operates the filter to modulate the continuous light such that the spectral composition of the light is gradually varied between the two output states.

11. The system of claim 9 wherein the controller operates the filter to modulate the continuous light such that the spectral composition of the light varies between the two output states in discrete steps.

12. The system of claim 9 wherein the controller includes means for modulating the intensity of the continuous light in conjunction with the modulation of the spectral composition of the broadcasted light by the modulator.

13. The system of claim 9 wherein the filter includes a dichroic mirror.

14. A system for generating and broadcasting lighting signals, comprising: a source of continuous light having substantially static spectral composition; a filter optically connected to receive light from the continuous source, the filter having at least two selectable settings for varying the spectral composition of the received light in accordance with the setting thereof; a converter optically connected to the filter for broadcasting the light into an ambient atmosphere; and a controller connected to the filter for selecting the setting thereof to selectively vary the color of the broadcasted light.

15. The system of claim 14 further comprising at least one fiber optic transmission medium for propagating light from the continuous source to the filter.

16. The system of claim 14 wherein the converter includes a lens.

17. The system of claim 14 wherein the controller controls the settings of the filter to periodically vary the broadcasted light in a repetitive pattern intended to communicate an emergency situation.

18. The system of claim 17 wherein the controller includes a memory that stores pattern information accessed by the controller for controlling the settings of the filter.

19. The system of claim 14 wherein the controller includes means connected to the continuous light source for varying the intensity of the continuous light source.

20. The system of claim 19 wherein the controller selects the setting of the filter in conjunction with the means for varying the intensity of the light source such that each filter setting is associated with an intensity setting.

21. The system of claim 20 wherein the controller controls the filter setting and the intensity of the light source to alternate the properties of the continuous light between at least two distinct output states at a repetition rate between one and four hertz.

22. The system of claim 21 wherein the controller includes means for varying the duty cycle of the first output state with respect to the duty cycle of the second output state.

23. A method of generating and broadcasting emergency lighting signals from an exterior surface of a vehicle comprising the steps of:
 a) in an interior space of the vehicle, generating a continuous beam of light that has a substantially static spectral composition;
 b) transmitting the continuous beam of light toward the exterior surface of the vehicle;
 c) varying an optical property of the continuous beam of light between at least first and second output states; and
 d) redirecting the varying light for broadcasting outwardly from the exterior of the vehicle.

24. The method of claim 23 wherein the step of varying the continuous light comprises the step of controlling a filter to select a first range of wavelengths of the continuous light for a first period of time and a second range of wavelengths of the continuous light for a second period of time to periodically vary the spectral composition of the broadcasted light.

25. The method of claim 23 wherein the step of varying the continuous light comprises the step of changing the intensity of the continuous light to provide light at a first intensity for a first period of time and a second intensity for a second period of time.

26. The method of claim 23 including the step of periodically adjusting the intensity of the continuous light to complement the periodic filtering of the light.

27. The method of claim 26 including the step of accessing a memory to obtain information for adjusting the intensity and controlling the filter.

28. The method of claim 23 wherein the step of varying the continuous light comprises the steps of changing the intensity of the continuous light to provide light at a first intensity for the first period of time and a second intensity for the second period of time, and controlling a filter to select a first range of wavelengths of the light at the first intensity and a second range of wavelengths of the continuous light at the second intensity to periodically vary the intensity of the broadcasted light in conjunction with the spectral composition thereof.

29. The method of claim 28 wherein the step of varying the continuous light comprises the step of accessing a memory to obtain information for changing the intensity and controlling the filter.

30. The method of claim 28 wherein the first period of time is substantially equal to the second period of time such that the rate of varying between states has a fifty percent duty cycle.

31. The method of claim 28 wherein the first period of time is greater than the second period of time such that the rate of varying between the high intensity state with respect to the low intensity state has a duty cycle greater than fifty percent.

32. A method of generating emergency lighting signals in a vehicle and broadcasting the signals to observers outside the vehicle, the method comprising the steps of:
 providing a light source in an interior space of a vehicle, wherein the interior space is not directly visible from a viewpoint external to the vehicle;
 generating continuous broadband light at the light source, where the light has a substantially static spectral composition;
 conveying the broadband light from the continuous source to a filter;
 periodically filtering the light at the filter to provide at least one color distinct from the broadband light;
 delivering the periodically filtered light to a location at the exterior of the vehicle; and
 redirecting and broadcasting the periodically filtered light from the exterior location into an ambient atmosphere surrounding the vehicle to signal observers outside of the vehicle of an emergency situation.

33. The method of claim 32 wherein the step of periodically filtering the continuous light comprises the step of controlling the filter to selectively filter a first range of wavelengths of the continuous light for a first period of time and a second range of wavelengths of the continuous light for a second period of time to periodically vary the spectral composition of the broadcasted light.

34. A system for generating and broadcasting lighting signals, the system comprising: a continuous light source having a substantially static spectral composition; a modulator optically coupled to the continuous light source for modifying the properties of the continuous light into modulated light periodically varying between at least two colors; a converter separate from but optically coupled to the modulator for dispersing the modulated light as it travels through the converter, the converter having a proximal end for receiving the modulated light and a distal end for broadcasting the light; and, a light pipe for communicating light from the continuous light source to the proximal end of the converter.

35. The system of claim 34 wherein the modulator is positioned between a distal end of the light pipe and the proximal end of the converter.

36. The system of claim 34 wherein the modulator is positioned between a proximal end of the light pipe and the light source.

37. The system of claim 34 including a controller for modulating an intensity of the continuous light source in conjunction with the modulation of the light between the at least two colors.

38. A system for generating and broadcasting lighting signals, comprising: a continuous light source of variable intensity and substantially static spectral composition; a filter optically connected to receive light from the continuous source, the filter having at least two selectable settings for modulating the spectral composition of the received light in accordance with the setting thereof; a converter optically connected to the filter for broadcasting the light into an ambient atmosphere; and a controller connected to the filter for selecting the setting thereof to selectively modulate the spectral composition of the broadcasted light in conjunction with a means for varying the intensity of the light source such that each filter setting corresponds to an intensity setting.

39. The lighting system of claim 38 further comprising at least one fiber optic transmission medium for propagating light from the continuous source to the filter.

40. The lighting system of claim 38 wherein the controller controls the settings of the filter to periodically vary the broadcasted light in a repetitive pattern intended to communicate an emergency situation.

41. The lighting system of claim 38 wherein the controller includes a memory that stores pattern information accessed by the controller for controlling the settings of the filter.

42. The lighting system of claim 38 wherein the converter includes a lens.

43. The lighting system of claim 38 wherein the controller controls the filter setting and the intensity of the light source to alternate the properties of the continuous light between at least two distinct output states at a repetition rate between one and four hertz.

44. The lighting system of claim 38 wherein the controller includes means for varying the relative duty cycles of the first and second output states.

* * * * *